United States Patent Office 3,435,781
Patented Apr. 1, 1969

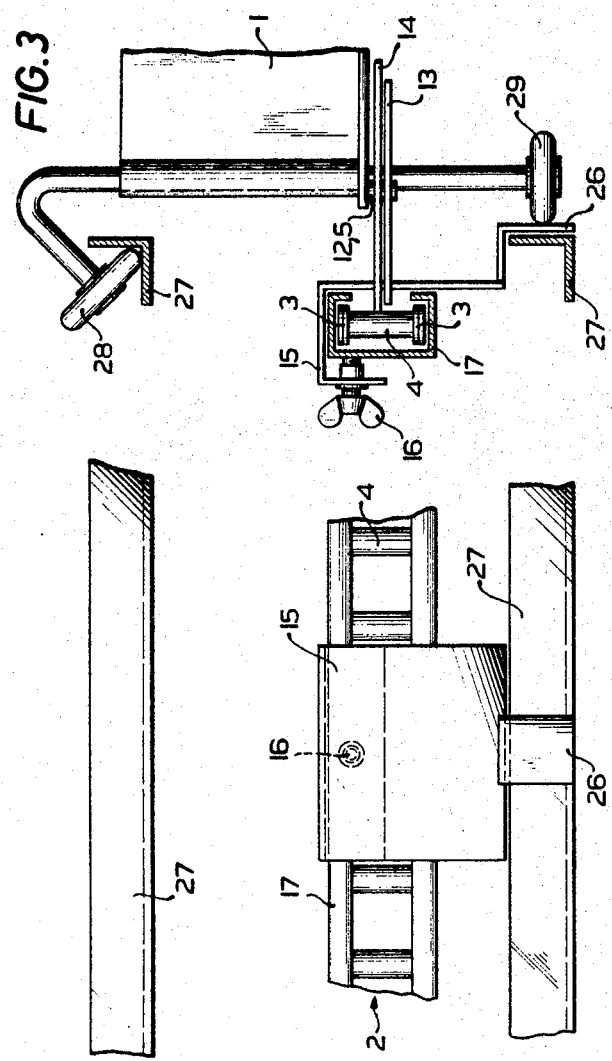

3,435,781
COUPLING DEVICE
Robert Klein, Jr., Landover Strasse 56,
Pirmasens, Pfalz, Germany
Filed Feb. 13, 1967, Ser. No. 615,852
Claims priority, application Germany, Feb. 11, 1966,
K 583,961
Int. Cl. B61b 13/00, 7/00, 9/00
U.S. Cl. 104—172                                    3 Claims

ABSTRACT OF THE DISCLOSURE

A coupling device for use in conveying installations where boxes or carriages containing blanks or articles being worked or treated are moved from one operating station to the other and where the coupling device is operative to connect and disconncet the carriage from the conveyer at any particular station and the coupling device of a preceding carriage at standstill is not connected to the conveyer when bumped by a succeeding carriage.

Background of the invention

The invention relates to a coupling device for catching and carrying along and for releasing transport carriages, carts or the like, in conveying installations where these transport containers are carried along by endless revolving conveyer means, for example conveyer chains. Such transport installations are in use in the most variegated industrial plants where large numbers of the same or equal objects are made from a multitude of individual parts such as, for example, in the shoe industry.

These conveying installations supply the individual operating stations that are arranged in sequence with the work material to be treated, for example work blanks where the transport boxes or cases, carriages or the like, which receive the work material or work blanks, must be stopped at the proper operating stations. This means that they must be disconnected or released from the conveyer means, for example a conveyer chain, that imparts the forward movement to them. The coupling device which is provided for establishing the connection between the transport boxes or the like and the conveyer chain must also uncouple the carriage at predetermined locations. It is furthermore necessary that uncoupling takes place also when a carriage bumps into a preceding carriage at standstill.

Coupling devices are known which release themselves by suitably arranged means at the particular stopping stations from the conveyer chain, but which in the next instant are again seized by the conveyer chain, whereupon immediately afterward the release of the coupling takes place again. This results in that the carriages execute a continuous minor reciprocating movement which results in an unnecessary continuous load or power consumption, and thus in premature wear of the coupling device, but which also produces additional noises in the course of operations that might be avoided and which ultimately disturb the operating personnel considerably and affect their ability to concentrate.

Accordingly, it has already been proposed to equip the coupling device with additional electromagnets to be controlled by it, which keep the coupling device during standstill of a carriage safely out of engagement with the conveyer chain or the like. The provision of such additional electromagnets, however, is extremely expensive. Besides the provision of the electormagnet proper, suitable switches and control circuits are also required. Finally, the coupling devices must at least partly be made of ferro-magnetic materials which, especially in more recent times, since transport boxes made of plastic material are extensively used, is not always the case.

By means of this additional electromagnet, it is possible to eliminate the continuous reciprocating movement of the transport carriages or the like which has heretofore taken place. In spite of the considerable expense involved with such electromagnets, it is still not possible to prevent this reciprocating movement of a further transport carriage which has bumped against the carriage stopped ahead of it and which must also be brought out of engagement with the transport means, i.e., the conveyer chain by means of a mechanism which is effective between the two carriages.

Finally, it is necessary with this known coupling device that the continuously rotating conveyer chain which is provided be equipped with special projections or extensions on some of its members, which by means of a suitable coupling bar, or the like, can come into engagement with the carriage.

The release device which is operative from one carriage to the other functions only when the carriages are accurately alined in a straight line one behind the other, but not at curves of the conveying path or track on which the carriages are running.

Other uncoupling devices which operate without electrical auxiliary means are dependent in their function either directly, or indirectly, from the particular load of the transport carriage. Due especially to this dependence, there arises the condition that the carriages after uncoupling are again engaged with the conveyer chain, are then again uncoupled, and this alternating of coupling and uncoupling is reflected by the aforementioned reciprocating movements.

Summary of the invention

It is an object of the invention to provide a coupling device which with purely mechanical means which are as simple as possible insures of efficient uncoupling at the stopping stations of the transport carriage, so that this is no longer influenced by the conveyer chain and stands still properly. This coupling device must furthermore be so constructed that it is released in a manner known per se by means provided in the stopping range along the conveyer chain, as well as also when running against a preceding carriage which is standing still at the moment. Finally, the recoupling should only require a minor movement in the feeding direction. To this is added a further problem to be solved, and that is that a carriage at standstill must not be pushed beyond its stopping position by a further carriage that arrives, which itself is then brought to a stop, while the coupling device of the carriage at standstill is unintentionally brought into engagement with the conveyer chain.

The problem is solved by the invention by means of a coupling device on the transport box or carriage which comprises two levers that are pivotable about a bolt, both of which have a trapezoidal cut-out in the direction of the transport carriage, which cooperate with a roller at the end of a spring-loaded lever, while furthermore a slide member can be provided in the range of the conveyer chain at any desired location which cooperates with a lever, while the other lever is in the form of a catcher that cooperates with the members of the conveyer chain, and the trapezoidal recesses at both levers are constructed in a manner that the lever which runs onto the sliding member presses by way of the lever roller against the oppositely disposed side of the trapezoid of the cutout of the catching lever.

The lever which carries the roll may be in the form of a double-armed lever and is connected at its free end with bumper rods, or the like, which extend in the direction of forward movement of the transport carriage.

For limiting the pivotal movement of the double-armed lever, two abutments may be provided.

The sliding member advantageously extends into the operating range of the running roller, or rollers, of the transport carriage over the running rail associated with the running roller or rollers. In this manner, a further obstacle is provided for the carriage at standstill which prevents that a carriage which may be following pushes it so far beyond the sliding member that the coupling device is again brought into engagement with the conveyer chain.

*Brief description of the drawings*

Further objects and advantages of the invention and details of the operation will become apparent from the following specification of an embodiment of the subject of the invention illustrated in the accompanying drawings in which:

FIG. 3 is a partial sectional view taken generally along the line III—III in FIG. 1;

FIG. 4 is a side view of the device as shown in FIG. 3 without the carriage, and FIG. 5 is a top view.

*Description of preferred embodiments*

Figure 1:
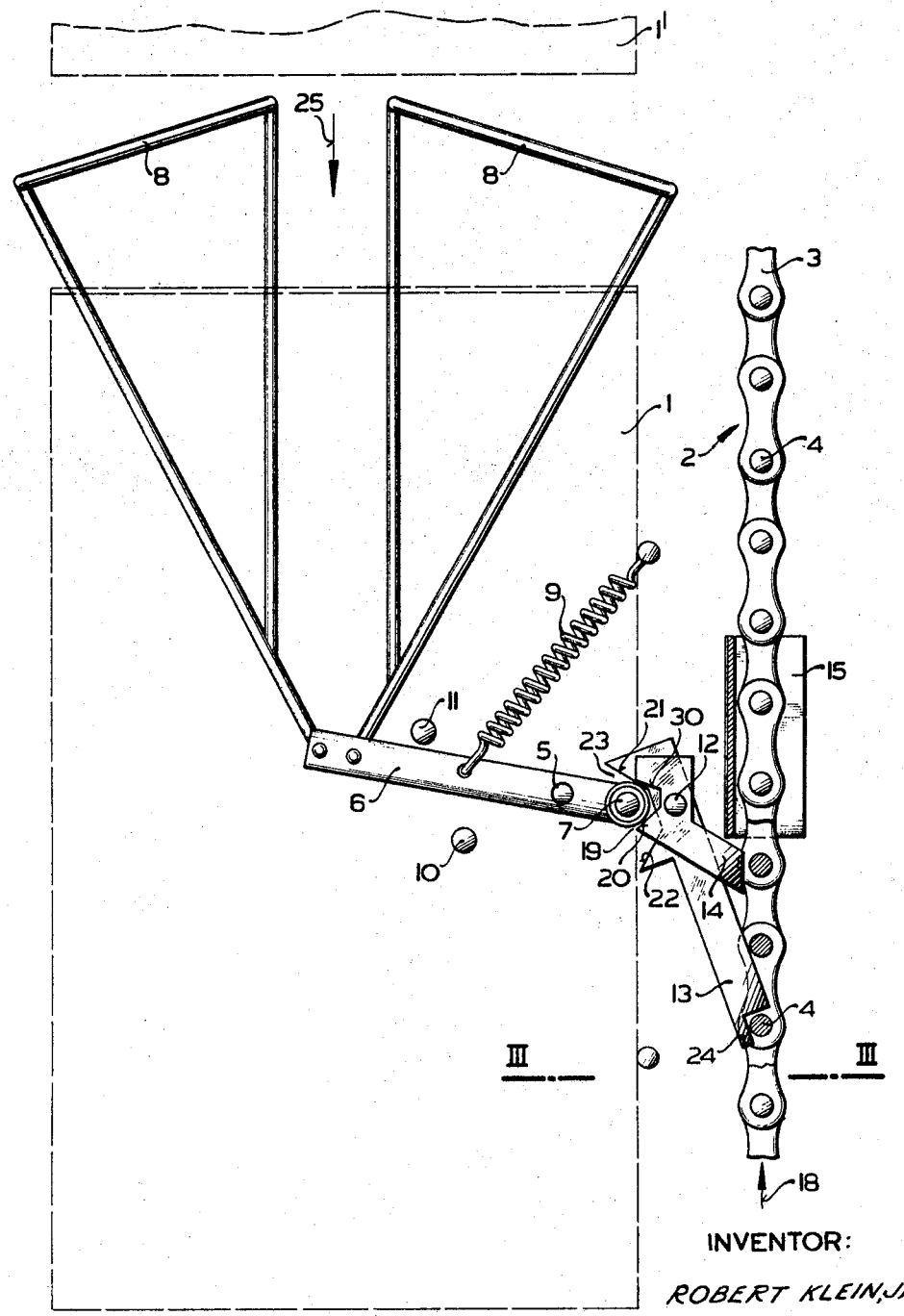
FIG. 1 is a schematic plan view of the coupling device in position of coupling with the conveyer chain.
Figure 2:
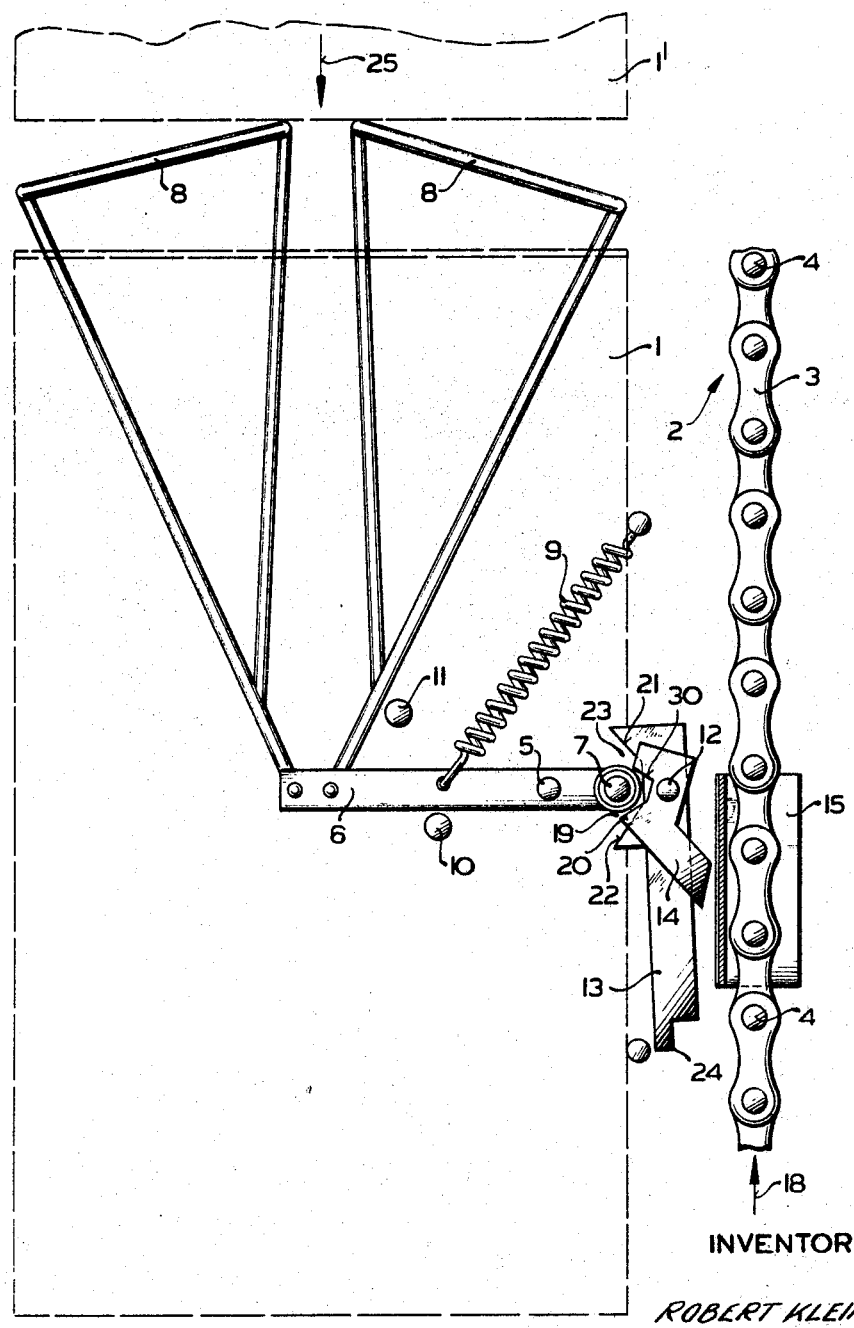
FIG. 2 is a plan view of the device in uncoupled position.

A transport carriage is moved forward by a conveyer chain or other suitable drive means on any desirable guiding means, such as guide rails or the like, with a coupling device interposed between the carriage and the coupling device. The conveyer chain illustrated comprises straps 3 and roller bolts 4 known per se.

At the bottom side of the carriage 1 a double-armed roller lever 6 is mounted for pivotal movement about a pin 5; it has a roller 7 at its end proximate the conveyer chain 2. At the opposite end means are provided in a manner known per se, which release the coupling of the coupling device when the carriage 1 runs against a preceding carriage 1' that is standing still. In the example illustrated these means are in the form of two coupling bumper rods 8 which are guided in transversely extending slots at the forward end of the carriage 1. The coupling bumper rods 8 are constructed in the manner illustrated so that they are also operative and effective when the carriages are located in a curve of their guide rails or other guide means.

The double-armed roller lever 6 is under the bias of a reset spring 9 and its rocking range is limited by two abutments 10 and 11.

The actual coupling device comprises two double-armed levers 13 and 14 which are pivotable about a pivot pin 12 the former of which is the catch and the other the uncoupling lever.

At the locations where the transport carriage is intended to come to a stop a slide member 15 is provided along the path of the conveyer chain 2. This slide member may be mounted for ready release by means of a wing screw 16 on any desired part of the carriage guide means or of the chain guide means. In the embodiment shown the slide member 15 is secured to the guide channel means 17 for the conveyer chain 17.

This slide member 15, the roller 7 of the roller lever 6 and two levers 13 and 14 cooperate in the following manner.

As the carriage advances in the direction indicated by the arrow 18 the uncoupling lever 14 runs onto the slide member 15 and as a result it is pivotably moved about the pivot pin 12. The uncoupling lever 14 is provided with a trapezoidal cut-out 19 in the region of the roller 7. The two oblique sides of this cut-out 19 define abutment surfaces 20 and 30 for roller 7. When the uncoupling lever 14 engages the slide member 15, the roller 7 is carried forward by the abutment surface 20 and in turn engages an abutment surface 21 of a trapezoidal recess or cut-out 23 whose other oblique or inclined flank forms a further abutment surface 22 of the catch lever 13, the free end of which has a cut-out or notch 24 for engagement with the roller pins 4 of the conveyor chain 2.

If the roller 7 presses against abutment surface 21 of the catch lever 13, the latter is disengaged from the conveyer chain, and this suddenly and completely, so that the carriage stops orderly and is completely withdrawn from the effect of the conveyer chain.

The same sequence takes place when the carriage 1 encounters with its bumper rods 8 or with one of them a preceding carriage 1' that stands still at the moment. The thrust effected in the direction of arrow 25 pushes the bumper rods 8 rearwardly, while roller 7 moves forward and again presses against the abutment surface 21 of the catch lever 13, which is disengaged from the conveyer chain 2.

When the working operations on the contents of carriage 1 have been terminated, it is pushed forward manually over a short distance until the levers 13 and 14 are guided past the slide member 15. The roller 7 is moved backward by biasing spring 9 and returns the uncoupling lever 14 to the position shown in FIG. 1. Also the catch lever 13 is brought with its notch 24 into engagement with a roller pin 4 of the conveyer chain 2, by roller 7 acting on the abutment surface 22.

This recoupling operation takes place also when a transport carriage 1 at standstill is freed by a preceding transport carriage 1' to be moved along. The return of lever 6 is then effected by the bias spring 9.

The slide member 15 can be provided with an extension 26 (FIG. 3), which projects into the range of one of the guide rails 27 for the running wheels 28 or 29 of the carriage 1. This extension is so proportioned in relation to the sliding member 15, that at the instant of the release of the catch lever 13 from the conveyer chain 2, the wheel 29 comes to a standstill on the running surface of the extension 26. If a further transport carriage now runs into the carriage 1 at standstill, it cannot be pushed beyond the slide member 15 by the thrust applied against it, as this would involve engagement of the catch lever with the conveyer chain 2, so that the transport carriage would unintentionally be caused to move again. The small resistance which the running surface or flank of the extension 26 offers the running wheel 29, is sufficient to prevent any unintentional insignificant forward movement of the carriage out of its uncoupling position. However, this small resistance can be readily overcome when the carriage is advanced manually.

It is essential for the satisfactory operation of a coupling device of this type, that the coupling and uncoupling takes place instantaneously or like a jump. This problem is solved by the construction of the coupling device in accordance with the invention. Furthermore the transport carriage can be coupled and uncoupled with conveyer chains that are guided along curved paths, because the catch lever and the roller lever are not connected with one another. Also differences in dimensions between the conveyer chain and the carriage guiding means can be compensated for by the disposition of the catch lever in accordance with the invention.

The uncoupling lever as well as the catch lever is independent of the roller lever; and in addition there is no direct dependence between the two levers, the uncoupling lever and the catch lever.

Having now described my invention with reference to the accompanying drawings, what I desire to protect by Letters Patent of the United States is set forth in the appended claims.

I claim:

1. Coupling means for carrying along and releasing transport carriages or the like in conveying installations having endless conveyer means, comprising a conveyer chain including bolts or the like, guide means for said carriages such as a guide rail extending generally along said conveyer means, said coupling means comprising, in combination, a pair of levers including a catch lever and a release lever pivotally movable about a common pivot pin movable with a carriage, each said lever having a trapezoidal cut-out each presenting a pair of abutment surfaces, a double-armed roller lever pivotally mounted on said carriage and having a roller at one end disposed in actuating relationship to said abutment surfaces, a spring biasing said roller lever in the direction of said cut-outs, a slide member disposed proximate said conveyer chain adapted to actuate said release lever and to be mounted in any desired location along said chain and along the path of travel of said release lever, and said catch lever having an end having a notch for engagement with a roller bolt of said conveyer chain and being movable in response to movement of said roller into engagement with the trapezoidal cut-out of said catch lever, and bumper rods supported on said roller lever at the end opposite the end having said roller said bumper rods, extending beyond the forward end of the carriage on which they are mounted and forming a unit with said roller lever in an arrangement independent of said catch lever and said release lever.

2. Coupling means in accordance with claim 1, including two abutment elements in the operating path of said roller lever for limiting the operating range thereof.

3. Coupling means in accordance with claim 1, where said slide member has an extension projecting into the proximity of said guide rail, and said carriage having at least one roller movable on said guide rail and onto the associated said extension.

References Cited

UNITED STATES PATENTS

| | | | |
|---|---|---|---|
| 2,619,916 | 12/1952 | Rainier | 104—172 |
| 3,130,685 | 4/1964 | Goodrich | 104—172 |
| 3,158,105 | 11/1964 | Robbins | 104—172 |

ARTHUR L. LA POINT, *Primary Examiner.*

DANIEL F. WORTH III, *Assistant Examiner.*